(12) United States Patent
Goulart et al.

(10) Patent No.: US 9,503,415 B2
(45) Date of Patent: Nov. 22, 2016

(54) UNIFIED NOTIFICATION PLATFORM

(75) Inventors: Valerie Lynn Goulart, Sunnyvale, CA (US); Michael Steffen Vance, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 370 days.

(21) Appl. No.: 13/015,508

(22) Filed: Jan. 27, 2011

(65) Prior Publication Data

US 2012/0198002 A1  Aug. 2, 2012

(51) Int. Cl.
*G06F 15/16* (2006.01)
*H04L 12/58* (2006.01)

(52) U.S. Cl.
CPC ............ *H04L 51/36* (2013.01); *H04L 51/14* (2013.01); *H04L 51/38* (2013.01)

(58) Field of Classification Search
CPC . H04L 12/5855; H04L 12/589; H04L 51/14; H04L 51/26; H04L 51/36; G06Q 10/107
USPC ........ 709/203, 206, 224, 207, 238; 715/769, 715/758; 455/186.1, 412.1, 466; 370/229, 370/401; 379/93.17, 67.1; 340/323, 539.13; 345/1.1, 4; 706/48
See application file for complete search history.

(56) References Cited

U.S. PATENT DOCUMENTS

| | | | |
|---|---|---|---|
| 5,315,642 A * | 5/1994 | Fernandez | 379/93.17 |
| 5,621,727 A * | 4/1997 | Vaudreuil | 370/401 |
| 5,663,717 A * | 9/1997 | DeLuca | 340/323 R |
| 6,459,440 B1 | 10/2002 | Monnes et al. | |
| 6,871,214 B2 * | 3/2005 | Parsons et al. | 709/206 |
| 7,336,950 B2 | 2/2008 | Pettine, Jr. | |
| 7,417,650 B1 | 8/2008 | Horvitz | |
| 7,444,449 B2 | 10/2008 | Åberg | |
| 7,487,467 B1 | 2/2009 | Kawahara et al. | |
| 7,519,672 B2 * | 4/2009 | Boss et al. | 709/206 |

(Continued)

FOREIGN PATENT DOCUMENTS

| | | |
|---|---|---|
| EP | 1748354 A1 | 1/2007 |
| JP | 10021039 A | 1/1998 |
| WO | WO2005017693 A2 | 2/2005 |

OTHER PUBLICATIONS

Android fanatic, "SMS Pop Up Review for Android," retrieved on Jan. 27, 2011 at <<http://www.androidfanatic.com/android-app-reviews/15-rokcontent-1/3317-sms-pop-up-review-for-android.html>>, Apr. 30, 2010, 2 pgs.

(Continued)

*Primary Examiner* — Dustin Nguyen
(74) *Attorney, Agent, or Firm* — Lee & Hayes, PLLC

(57) ABSTRACT

Notifications are managed in a unified notification platform that receives messages from disparate services, formats, and protocols, and with disparate attributes and meta-attributes. The unified notification platform provides for user defined meta-attributes to allow rapid classification of incoming messages accordingly to user relationships to message senders, including family, friends and co-workers. Incoming messages are received by a message queue component, serialized and prioritized according to a rules engine. Various user interfaces provide views and reports on the serialized messages. In particular a non-modal notification pop-up is disclosed. The unified notification platform exposes an application programming interface provides automatable and remotable programmatic access for application developers.

19 Claims, 6 Drawing Sheets

(56) References Cited

U.S. PATENT DOCUMENTS

| | | |
|---|---|---|
| 7,577,922 B2 | 8/2009 | Mann et al. |
| 7,712,040 B2 | 5/2010 | Aoyama |
| 8,019,368 B2* | 9/2011 | Lorello et al. ............... 455/466 |
| 8,023,408 B2* | 9/2011 | Herrmann ..................... 370/229 |
| 8,023,975 B2* | 9/2011 | Wickman et al. ............ 455/466 |
| 8,341,261 B2* | 12/2012 | Fuse et al. .................... 709/224 |
| 2003/0011638 A1 | 1/2003 | Chung |
| 2003/0046421 A1* | 3/2003 | Horvitz et al. ............... 709/238 |
| 2003/0105827 A1* | 6/2003 | Tan et al. ...................... 709/206 |
| 2004/0242202 A1* | 12/2004 | Torvinen ..................... 455/412.1 |
| 2004/0261031 A1 | 12/2004 | Tuomainen et al. |
| 2005/0044058 A1 | 2/2005 | Matthews et al. |
| 2005/0181836 A1 | 8/2005 | Kamat |
| 2006/0090169 A1 | 4/2006 | Daniels et al. |
| 2006/0240877 A1 | 10/2006 | Filiba et al. |
| 2006/0284787 A1* | 12/2006 | Bear et al. ..................... 345/1.1 |
| 2007/0064883 A1* | 3/2007 | Rosenthal et al. ........... 379/67.1 |
| 2007/0112918 A1* | 5/2007 | Berstis .......................... 709/206 |
| 2007/0129090 A1 | 6/2007 | Tarn |
| 2007/0129112 A1 | 6/2007 | Tarn |
| 2007/0174786 A1 | 7/2007 | Doi et al. |
| 2007/0192734 A1 | 8/2007 | Berstis et al. |
| 2007/0264956 A1* | 11/2007 | Bicker et al. ............. 455/186.1 |
| 2007/0300178 A1 | 12/2007 | McArdle |
| 2008/0133748 A1 | 6/2008 | Nicholas |
| 2008/0139190 A1 | 6/2008 | Bunte et al. |
| 2008/0209546 A1 | 8/2008 | Kim |
| 2008/0242370 A1 | 10/2008 | Lando et al. |
| 2009/0042542 A1 | 2/2009 | Dias |
| 2009/0089716 A1 | 4/2009 | Chen et al. |
| 2009/0132662 A1* | 5/2009 | Sheridan et al. ............. 709/206 |
| 2009/0150507 A1* | 6/2009 | Davis et al. .................. 709/207 |
| 2009/0192970 A1* | 7/2009 | O'Sullivan et al. ............ 706/48 |
| 2009/0252305 A1 | 10/2009 | Rohde et al. |
| 2009/0305732 A1 | 12/2009 | Marcellino et al. |
| 2009/0307268 A1 | 12/2009 | Chappell et al. |
| 2010/0077347 A1 | 3/2010 | Kirtane et al. |
| 2010/0175010 A1* | 7/2010 | Jeyabalan et al. ............ 715/769 |
| 2010/0205545 A1* | 8/2010 | Dawson et al. .............. 715/758 |
| 2011/0298614 A1* | 12/2011 | Bells ........................ 340/539.13 |
| 2011/0307547 A1* | 12/2011 | Backer et al. ................ 709/203 |

OTHER PUBLICATIONS

"ECMA Script Pop-up Window," Vulpine Mobile, retrieved on Jan. 27, 2011 at <<http://vulpine.nnobi/pdf/ecmascriptpop-upwindow.pdf>>, available as early as Jun. 21, 2010, 9 pgs.

iPhoneChris, "iPhone Text Message Privacy: How to Turn off SMS Preview", retrieved on Jan. 27, 2011 at <<http://www.appleiphonereview.com/iphone-tutorials/iphone-text-privacy-how-to-turn-off-sms-preview/>>, Aug. 12, 2007, 11 pgs.

Kirda et al, "A Service Architecture for Mobile Teamwork," Proceedings of the 14th International Conference on Software Engineering and Knowledge Engineering, SEKE '02, Jul. 15-19, 2002, Ischia, Italy, pp. 513-518.

\* cited by examiner

UNIFIED NOTIFICATION PLATFORM

BACKGROUND

Convergence is where a single platform unifies data and applications traditionally hosted on different platforms. Convergence may be from the perspective of a hardware device. In this case, an example of device convergence may be a mobile phone equipped with a stylus and a touch screen to support software for calendaring, note taking, and other functionality typically hosted in a personal device assistant ("PDA"). Alternatively, convergence may be from the perspective of software applications. In this case, an example of software application convergence may be Unified Messaging where voicemail messages are rendered as electronic mail ("email") thus obviating the need to check for pending messages on two mailboxes on two different and separate platforms. Yet another form of convergence may be from the perspective of data formats and/or protocols. In this case, an example of data format and/or protocol convergence is the blurring of packet networks which traditionally carried only application data and switch networks which traditionally carried only voice data. Post convergence, packet networks support protocols to carry voice data, and conversely switch networks support protocols to carry email, internet browsing and other application data.

The present widespread market acceptance of mobile cellular devices has driven many variations and combinations of hardware, software and data format and/or protocol convergence. As processing power for mobile devices increases, and input/output devices such as transducers and touch screens miniaturize, handheld form factor devices have been merged into mobile phones. Mobile music player functionality, PDA functionality, digital still camera functionality, video camera functionality, audio recorder functionality and geolocation functionality are but a few of the many device platforms that have been converged into a mobile phone device platform. The effort to pack such a large amount of functionality into a mobile phone has required a tremendous and expensive investment in the industry as well as a veritable technical tour-de-force.

However, successful device convergence does not necessarily lead to successful application convergence. For example, a mobile phone equipped with sufficient memory to carry a library of music and a headphone jack to render music, may not necessarily have user friendly software to quickly search and retrieve a particular song. It is possible for a user interface to be so inconvenient to use, that a typical user may simply not make use of present hardware functionality.

Similarly, successful device convergence does not necessarily lead to successful data format and/or protocol convergence. For example, a mobile phone may have a protocol stack capable of receiving application data over a cellular transport. However, the mobile phone may not have network drivers that expose an application programming interface ("API") sufficiently rich to enable a wide range of applications. It is possible for an API to be so lacking or difficult to use that application developers are not able to provide users with applications that fully exploit the possibilities afforded by data format and/or protocol convergence.

In either of these situations, any market advantage achieved by converging hardware functionality is lost. In general, overcoming tremendous difficulties in convergence may not be rewarded in the market without corresponding improvements in user experience and application developer support.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Introduction

Figure 1:
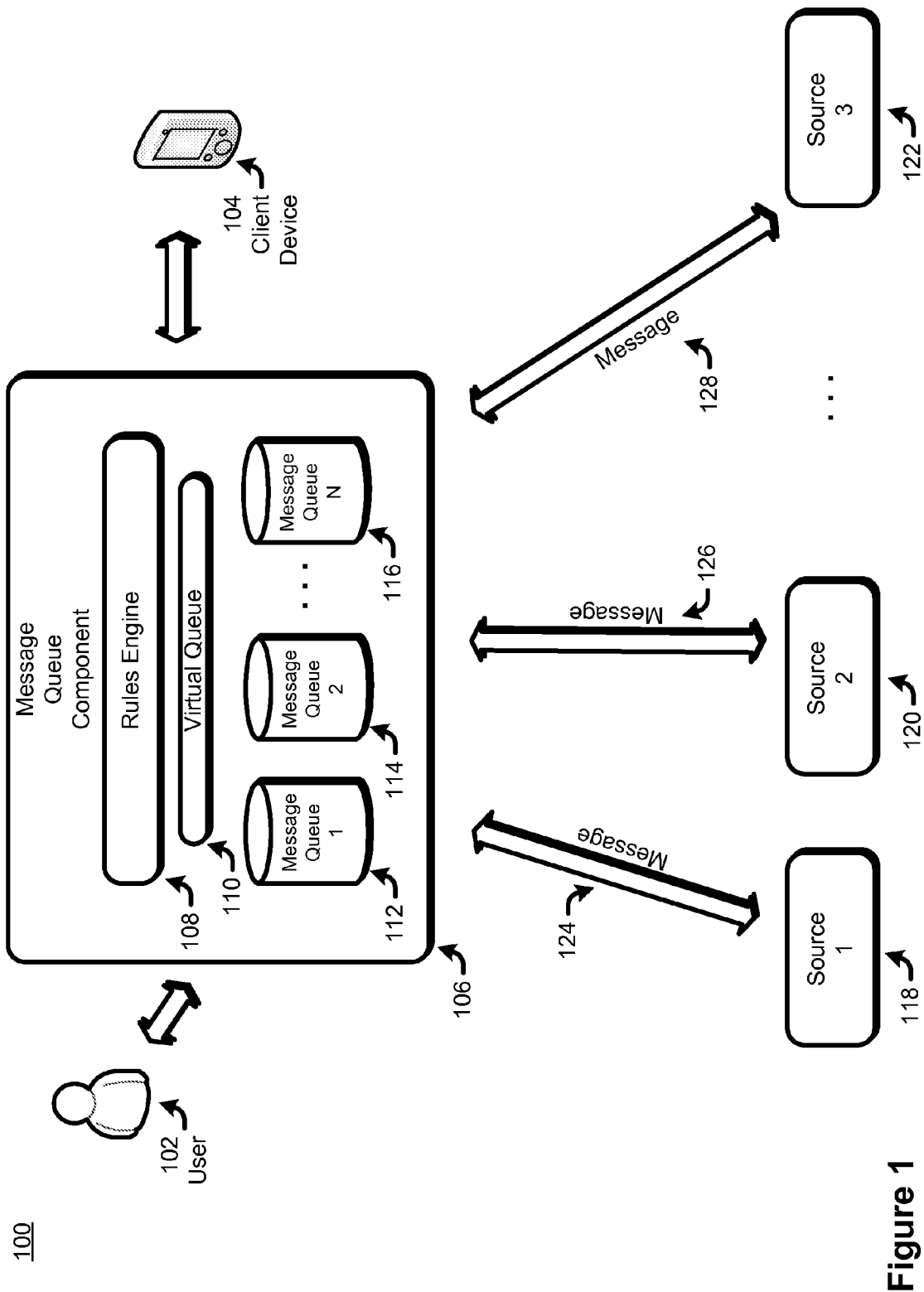
FIG. 1 is an operational overview diagram for the unified notification platform.

This disclosure relates to a platform to unify messages on mobile devices which may include mobile phones, netbooks, laptop computers and mobile tablets. Specifically, this disclosure describes a platform to review messages from disparate sources, formats and transports. This platform, collectively referred to herein as a unified notification platform, comprises a user interface that enables unified message review without blocking workflow of other running applications, a unified message queue, a rules engine to allow rich customization of unified message queue behavior, and an application programming interface to provide applications developers programmatic access to the aforementioned user interface, message queue and rules engine.

The unified notification platform provides many features to eliminate discontinuities in the user's experience with a unified message queue, and with the user's experience with the unified message queue as integrated with a mobile device as a whole. The user interface includes a non-modal notification pop-up window which does not block access to other user interfaces when the pop-up appears. In this way, the user's workflow and train of thought is not interrupted while receiving notifications.

The unified notification platform may couple the user interface with a unified message queue that recognizes not only data format attributes of incoming messages, but also user relationship centric meta-attributes. Examples of user relationship centric meta-attributes may include message information whether the message source is work related, or alternatively whether the message is from a parent/guardian. In this way, a work related alert may be prioritized over personal alerts such as Tweets and Facebook™ notifications. In particular, notification systems were originally developed to alert users of events, thus freeing users from repeatedly checking messages. Due to the present mass of notifications from disparate applications, users are in effect trained to ignore notifications, and periodically check messages obviating the design goals of notifications.

The unified notification platform may support user customization via a rich rules engine. Because the unified message queue supports not only data format attributes, but user relationship centric meta-attributes of messages, the rules engine may be configured according to user relationship centric patterns. For example, a child's cell phone may be configured via the rules engine to display messages from a parent/guardian first, or to suppress all other messages until the parent/guardian's messages are read first. The notification pop/up and/or unified message queue may be customized to suppress or purge notifications during sleep periods, as not to present a user with a disproportionately large number of notifications upon return.

A user notification platform exposes all aspects of the notification pop-up user interface, the unified message queue, and the rule engine via a rich application programming interface ("API"). Accordingly, the API provides application developers with full access to all features for custom applications. In particular, the notification pop-up interface, the unified message queue and the rules engine may support automatable and remotable properties, methods and programmatic events thereby enabling scripting.

Overview of a Unified Notification Platform

As noted above, the present unified notification platform removes various user experience discontinuities with unified messaging via providing a non-modal notification pop-up user interface, a unified message queue, a rules engine, and an API. FIG. 1 illustrates an example operation 100 of the unified notification platform.

A user 102 may host the unified notification platform on a client device 104. The client device 104 may be a mobile device including, but not limited to mobile phones, netbooks, laptop computers and mobile tablets. In alternative embodiments, the client device 104 may be standalone personal computer, terminal, or non-portable embedded system. In yet other embodiments, the user 102 may host the unified notification platform on a distributed system comprising one or more servers and the client device 104. In the distributed embodiment, the unified notification platform may be hosted fully or in part, on one or more servers. Accordingly the unified notification platform has broad applicability to a wide range of hosts.

Client device 104 displays a user interface that may couple to a message queue component 106 which may be configured via rules executed by a rules engine 108. The message queue component 106 may access one or more message queues (112, 114, 116) specific to particular message data format, message transport, message attribute or message user relationship centric meta-attribute. Accordingly, message queues (112, 114, 116) act at least as initial receiving queues to perform message specific processing, such as packet payload extraction, decompression, decryption, verification, and classification by attribute and/or meta-attribute.

Messages may arrive from one or more message sources (118, 120, 122). A message source may be differentiated by a data protocol, for example a first source representing email over SMTP and a second source representing SMS text messages. Alternatively, a message source may be differentiated by an application source such as Twitter™ notifications, email notifications, voicemail notification and operating system/device notifications. Yet another message source differentiator may be user relationship centric meta-attributes, for example differentiating personal notifications from Facebook™ from emergency email notifications from the user's 102 employer.

Each message source (118, 120, 122) asynchronously broadcasts messages (124, 126, 128) respectively to an address associated with a user's message queue component 106. The address may relate to the user's client device 104, or in a distributed embodiment may relate to one or more servers which serve data to the user's client device 104, depending on the hosting location of the message queue component 106.

It is to be noted that the various messages (124, 126, 128) may be comprised of multiple parts. For example, email is typically transmitted over packet networks. Accordingly, large emails may be separated into multiple packets which arrive separately. By way of another example, some notifications are transacted where a first portion containing the data is locked until a second portion containing a transaction commit operation enables access.

Accordingly, the various messages (124, 126, 128) are sent to their respective message specific queues (112, 114, 116) for processing. The message specific queues (112, 114, 116) may be the internal processing queues for a particular protocol or data format. Alternatively the message specific queues (112, 114, 116) may be separate queues specific to the message queue component 106. An example of message queue component 106 specific queue is a queue that recognizes attributes or user relationship centric specific meta-attributes of messages.

The rules engine 108 asynchronously manages a virtual queue 110 consolidating the various message specific queues (112, 114, 116). The rules engine 108 extracts messages from the various message specific queues (112, 114, 116) in the virtual queue 110, prioritizes the extracted messages, and then presents the messages to client device 104 in a user interface according to the specified rules. The user interface on client device 104 may be a non-modal notification pop-up window, that does not block the operation of software user interface of other opened applications Example Hardware and Software Configuration FIG. 2 illustrates an example hardware and software for the unified notification platform.

A. Example Unified Notification Platform Hosting Hardware

Figure 2:
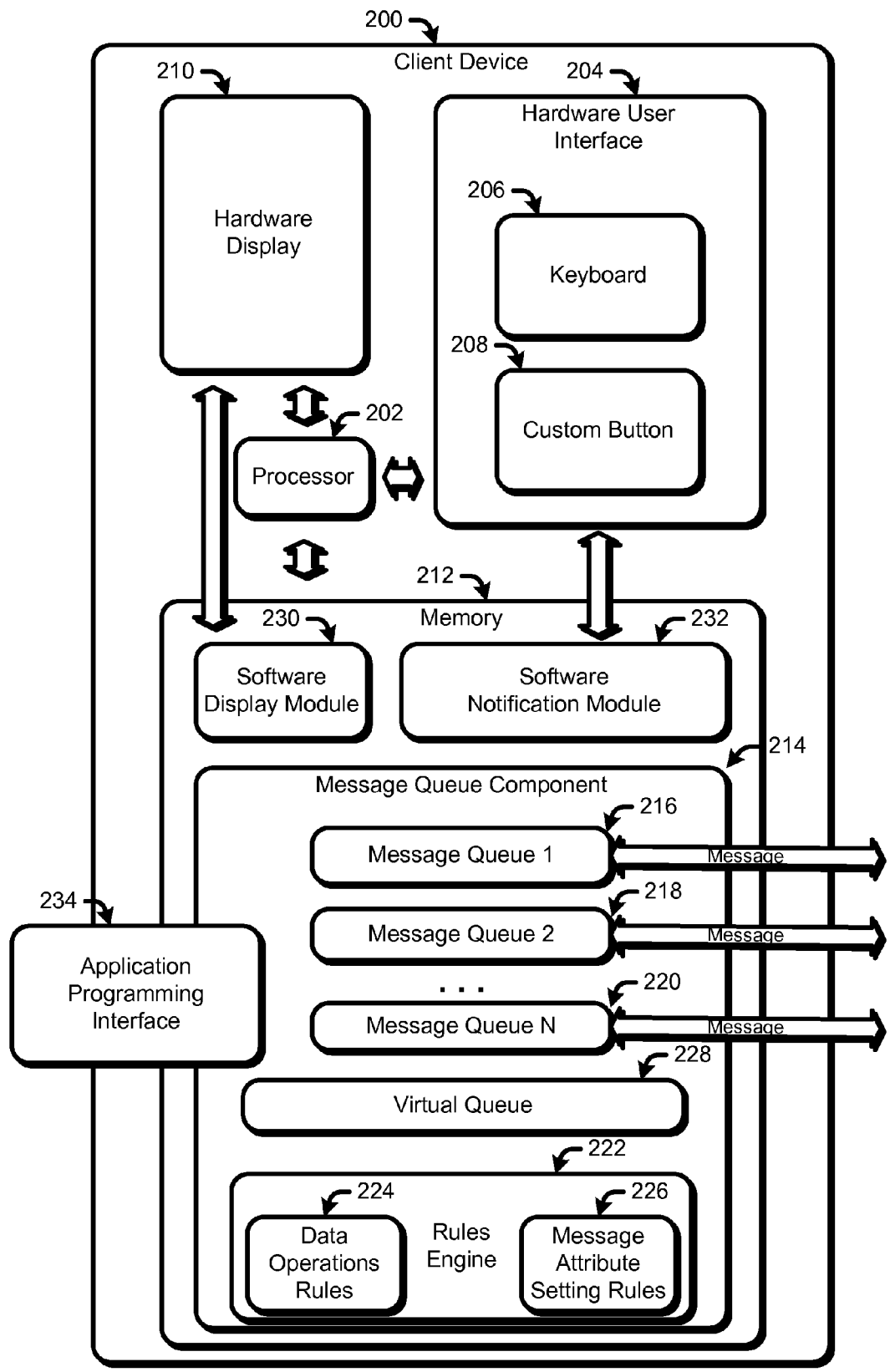
FIG. 2 is an example hardware platform for the unified notification platform.

FIG. 2 depicts an example client device 200 for the unified notification platform. The example client device 200, the need not be comprised of a single standalone unit, as alternative embodiments may distribute hardware and software functionality on different hardware hosts.

Client device 200 may comprise a processor 202, a hardware user interface 204 potentially comprising a keyboard 206 and/or custom button 208, a hardware display 210, and a memory 212.

The custom button 208 may be a dedicated button or hardware control operative that may be mapped to a particular software function. In one embodiment, the custom button 208 may activate a notification pop-up user interface. In another embodiment, the custom button 208 may trigger a refresh of the message queue.

Hardware display 210 may be a touch screen supporting virtual keyboards. Accordingly, the keyboard 206 may be optional. Alternatively, for personal computer and other terminal based embodiments, the hardware display 210 may be a monitor separate from a standalone device.

Memory 212 includes both short term and long term memory and may host the unified notification platform. Examples of short term memory include static random access memory ("SRAM") and dynamic random access memory ("DRAM"). Examples of long term memory include programmable read only memory ("PROM") and hard disks.

Both short and long term memory both on-board and removable computer-readable media. Computer-readable media includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

B. Example Unified Notification Platform Software Configuration

The unified notification platform as hosted in memory 212 comprises a message queue component 214 including one or more message specific queues (216, 218, 220), a rules engine 218 including data operations rules 224 and message setting rules 226, a virtual queue 228, a software display module 232, and a software notification module 234.

The message queue component 214 is comprised of various message specific queues (216, 218, 220) and a virtual queue 228 of messages. It may comprise a rules engine 222 or may alternatively be coupled to an external rules engine.

The various message specific queues (216, 218, 220) operate to receive messages and notifications that must be processed together. As noted above, there is a large range of bases for separate processing such as different protocols reconstituting messages differently, and different messages and notifications being subject to different security schemes.

The message queues may optionally be associated with message queue software drivers to perform the message specific processing. In this way, the message queue component may be extended to support new data formats, protocols, attributes and meta-attributes over time. Additionally, the messages queue software drivers may allow data operations on the various message specific queues (216, 218, 220).

The rule engine 218 may perform data operations on both the various message specific queues (216, 218, 220) and a virtual queue 228 of messages. The rules engine 218 may operate to read a script of data operations rules 224, which when execute create one or more directives to create, retrieve, update/modify, and delete messages as well as retrieve attribute, meta-attribute and queue statistics on the various message specific queues (216, 218, 220) and the virtual queue 228. The rules engine 218 may also set and retrieve message attributes and meta-attributes according to message attribute setting rules 226 on the various message specific queues (216, 218, 220) and the virtual queue 228. Thus, not only may the rules engine may manage a virtual queue 228 of messages filtered from the various message specific queues (216, 218, 220), but may also perform management operations on the various message specific queues (216, 218, 220) such as purging queues and auditing. The message queue component 214, rules engine 218 and virtual queue 228 are described in greater detail below with respect to FIG. 5.

The software display module 230 provides unified notification platform specific user interface. An example unified notification platform specific user interface may be a non-modal notification pop-up window as described below with respect to FIGS. 3A, 3B, 3C, 4A and 4B.

The software notification module 232 provides a clearinghouse to both receive and broadcast software notifications within the unified notification platform. Specifically, the software notification module 232 enables the receipt of custom events to trigger actions within the unified notification platform. Examples may include subscribing to custom button 208 events such that when pressed, the software display module 230 displays a notification pop-up window. Alternatively, a keyboard chord such as CTRL-M could be mapped to the software display module 230 as well.

Conversely, events within the unified notification platform could be exposed via the software notification module 232 and subscribed to. One example may include receipt of a high priority message where a subscribing third party application proactively displays an alert to the user. By way of another example, message addition software events and reordering operation software events within the virtual queue may be subscribed to by a utility to track provide audit and debug information.

The unified notification platform supports extensibility and application development support via an application programming interface ("API") 234. Specifically the API 234 programmatically exposes properties, methods and programmatic events of the unified notification platform. Via a software library, developers may program third party applications hosted on the client device 200. The API 234 may be automatable and remotable to enable scripting languages access to the unified notification platform. Rules engine 222 or an external rules engine may invoke API 234 to perform operations on the various message queues (216, 218, 220), the virtual queue 228, and other portions of the unified notification platform. Accordingly, notification management may be effected both by custom applications running on the client device 200 or alternatively via applications running remote of the client 200 interfacing via the network or input/output ports.

Example User Interface for the Unified Notification Platform

The unified notification platform supports a wide range of user interfaces via software display module 230. Specifically, any data relating to the virtual message queue 228, the various message queues (216, 218, 220) and the messages and notifications within, may be aggregated and reported.

A. Example Reports

Example aggregations may include message count by message service, message count by message thread, and message thread count.

A message count by message service report provides counts of the number of messages and notifications for messages requiring the same processing. SMS text and SMTP mail are two different services based on transport and protocol stack. However, services may be defined by a combination of attributes and user relationship centric meta-attributes. Accordingly, Facebook™ notifications and Twitter™ tweets might be examples of two different services. Since the various message queues (216, 218, 220), are defined in the same terms, message count by message services may be calculated by invoking queue counts from the respective drivers of the various message queues (216, 218, 220). Alternatively, a version of the message count by message service report may be implemented via performing message and notification counts by attributes and/or meta-attributes in the virtual queue 228.

A message count by message thread report provides counts of messages and notifications related by message thread. For example, an email thread consisting of an initiating email, a response email, and a response to the response would have a message count of three. In a message queue that combined voicemail and email, an initiating phone call replied to via a response email would have a message count of two, despite the two messages having different transports. In the event that the unified messaging provides for processing in the same message queue (216, 218, 220), the attributes and meta-attributes may be reviewed to identify and count which messages and notifications belong to the same message thread. In the latter example, messages and notifications from different messages queues (216, 218, 220) may have to be counted together. Accordingly, in one embodiment, the virtual queue could be searched to identify which messages and notifications belong to the same message thread.

A message thread count report is related to the message count by message thread report. The message thread count report simply reports a count of message threads presently managed by the unified notification platform. For example a unified notification platform that had a message thread relating to "Classroom Assignment" and another message thread relating to "After Work Basketball Game" would have a message thread count of two. The message threads could be identified in the same ways that the message count by message thread reports disclosed above.

The aforementioned is not intended to be an exhaustive list of reports. A person having ordinary skill in the art will recognize variations to the aforementioned reports and all other reports herein.

B. Example Message Attributes and Message Meta-Attributes

Message and notification operations, in particular searching and sorting may depend on what message attributes and meta-attributes are associated with the messages and notifications. In particular, message attributes are property values associated with a message that relate to routing and the contents of the message. Typically attributes are not user definable and are artifacts of the routing protocol. Table 1 below enumerates some example message attributes:

TABLE 1

Example Message and Notification Attributes

| Attribute | Description |
| --- | --- |
| Date Time Stamp | Date and time that the message was written or last modified |
| Read Flag | Indicator as to whether the recipient has read the message |
| Sender Identifier | User identity of the sender of the message |
| Subject Identifier | Subject line summarizing the contents of the message |
| To Line | List of recipients addressed in the message |
| Message Memory Size | Byte count of the absolute size of the message including attachments |
| Attachment Included Flag | Indicator as to whether an attachment is embedded in the message |
| Importance Flag | Indicator of the relative urgency of the message; typical values are "High", "Normal" and "Low" |
| Source Identifier/ Originating Application | Property indicating the application that generated the message or notification; for example Facebook ™ or Twitter ™ |

Message and notification meta-attributes are property values associated with a message and are generally user defined. The meta-attributes are defined to facilitate identifying messages and notifications that are to be processed together, for example in the same message queue. Table 2 below enumerates some example message and notification meta-attributes:

TABLE 2

Example Message and Notification Meta-Attributes

| Meta-Attribute | Description |
| --- | --- |
| Parent/Guardian Flag | Indicator that the message was from a parent or guardian and may be prioritized above other messages |
| Source Identifier/ Originating Application | Property indicating the application that generated the message or notification; for example Facebook ™ or Twitter ™ |
| VIP Indicator | Indicator that the message was from a preferred sender and may be prioritized above other messages |
| Family Member | Indicator that the message was from a family member; may be used to help coordinate family plan billing |
| Friend | Indicator that the message from a person designated as a friend |
| Group Association | Property indicating the name of a professional or social group the sender is associated with in common with the recipient; for example Seattle Seahawk Football Fans Facebook ™ |
| Work Flag | Indicator that the message was from an address related to the recipients employer |
| Priority | Relative priority level for routing |

As can be seen from Table 2, some of the message and notification meta-attributes describe user relationships. User relationship information may be utilized to increase or decrease the priority level of messages and/or to change the behavior of the unified notification platform. An example of a unified notification platform behavioral change may be to block all other messages and notifications until all messages marked with a parent/guardian flag are read. Another example would be to display all messages and notifications marked with a work flag first.

In particular, behavioral changes of the message queue component may be effected via rules executed in the rules engine 222. Notwithstanding the emphasis on user relationship information, not all behavioral changes in the message queue component are specific to user relationship information. For example, rules may be set to perform an operation after a predetermined time period has passed. Additionally, rules by be set conditions from events external to the message queue component. For example, the message queue may block access to messages where a service payment has been missed. Operation of the rules engine is described in more detail with respect to FIG. 5.

It is possible for the set of message and notification attributes to overlap with the set of message and notification meta-attributes. For example, both Table 1 and Table 2 above have a source identifier/originating application field. Whether data is an attribute or meta-attribute may depend on context. Thus although an attribute X and a meta-attribute Y are to store the same data, their values may be set by different programs. Accordingly, this provides a vehicle by which to verify and authenticate incoming messages. For example, the rules engine may introduce logic to determine whether the source identifier attribute and the source identifier meta-attribute are consistent. Where the values are inconsistent, the rules engine may quarantine or otherwise block access to the message. Alternatively, an attribute may store a cryptographic key from one party and a meta-attribute may store a security certificate from another party. Upon receipt, the rules engine might perform a check to ensure the cryptographic key properly corresponded to the security certificate. In this way, the rules engine in concert with attributes and meta-attributes may perform spoof checking, security certification, spam filtering, and other security functions.

C. Non-Modal Notification Pop-Up Window

One example user interface for the unified notification system is a notification pop-up window that displays summaries of messages, message threads, and/or contents of the unified message queue in a non-modal window.

Non-modal windows are active windows in a graphical user interface that do not block the operation of software user interface of other opened applications. Non-modal windows are the converse of modal windows that deactivate all other user interface elements except for those within the modal dialog box. Examples of modal windows are alert dialog boxes, or confirmation dialog boxes (e.g., a warning window stating "Do you really want to delete file X?"). While the developer intent is to ensure the user's attention is directed to the modal dialog box, in many scenarios, such as multi-tasking mobile devices, the effect is often to inconvenience a user whose attention must be directed elsewhere. For example a user in the midst of typing an email may lose his or her train of thought when presented with a modal alert.

Figure 3A:
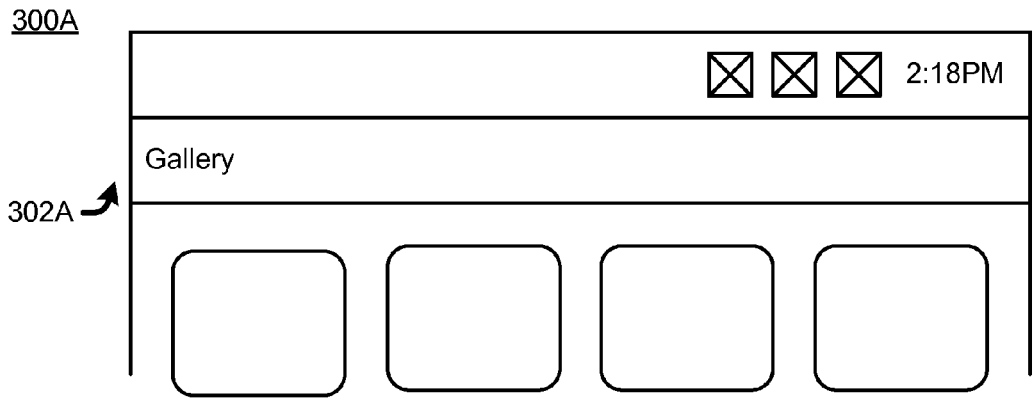
FIGS. 3A, 3B and 3C illustrate screen shots of a non-modal notification pop-up user interface.
Figure 3B:
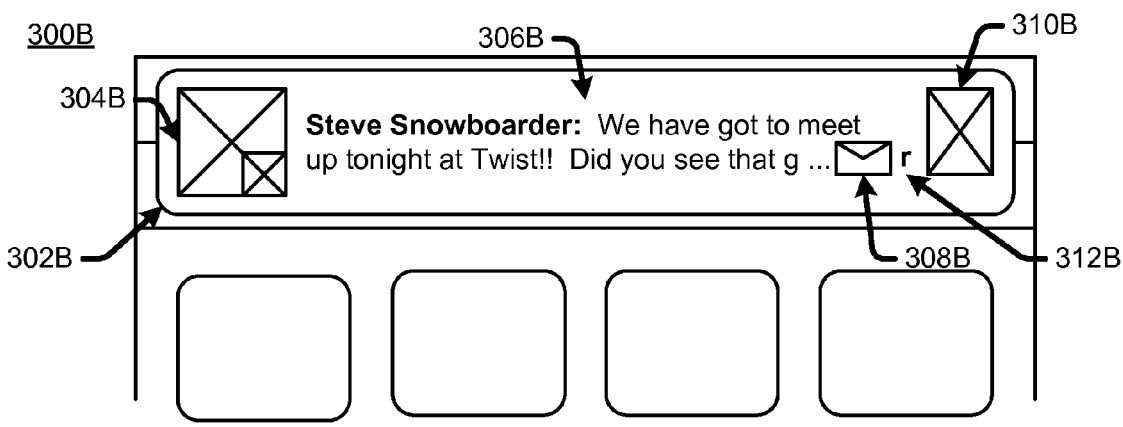
Figure 3C:
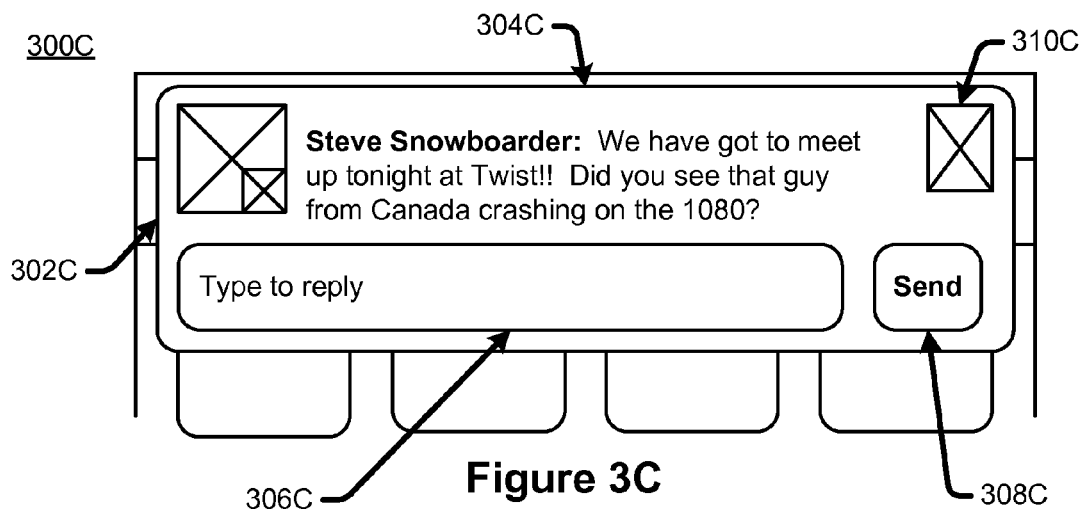

FIGS. 3A, 3B and 3C provide screen shots of an example embodiment of a non-modal notification pop-up window.

FIG. 3A shows a screen shot 300A of a user operating an application called "Gallery" 310A viewing digital pictures 320A. At this point, there is the non-modal notification pop-up window has not yet appeared.

FIG. 3B shows a screen shot 300B of the non-modal notification pop-up window 302B appearing upon receipt of a message. The non-modal notification pop-up window 302B may display the sender's portrait 304B and will display a predetermined or preconfigured number of characters from the message 306B along with a sender identifier. The message can also show an icon 308B indicating the type of message, in this case email, or some other predetermined or preconfigured icon 308B to indicate attributes or meta-attributes associated with the message. Alternatively, the user interface may be configured to suppress the non-modal notification pop-up window 302B from appearing. The user may explicitly dismiss the non-modal notification pop-up window 302B by pressing the exit button 310B. If the user does not engage the non-modal notification pop-up window 302B, it will disappear after a predetermined or user configured amount of time. Finally, activate icon 312B provides the user with a reminder for a hotkey to activate the non-modal notification pop-up window 302B, in this case CTRL-R.

Throughout this period, because the notification pop-up window 302B is non-modal, the user is not interrupted in his or her use of the Gallery application 302A. The user may continue to review digital pictures 304A, and the Gallery application 302A continues to receive user input. Because the non-modal notification pop-up window 302B only covers the title bar of the Gallery application 302A, the user's substantive view of the Gallery application 302A is not obstructed.

FIG. 3C shows a screen shot 300C upon activating the non-modal notification pop-up window 302C, by pressing CTRL-R. Non-modal notification pop-up window 302C is expanded, this time showing either the entire message, or the maximum portion of the message that fits 304C. To make room for the message, icons 308B and 312B disappear.

The user may enter a reply message in the reply box 306C. The user may subsequently press the Send button 308C to send the entered reply. In other embodiments, the user may enter in-line comments in the incoming message or notification, as part of the reply. Upon sending, the non-modal notification pop-up window 302C disappears. Alternatively, the user may cancel operation by pressing the exit button 310C at any time.

Figure 4A:
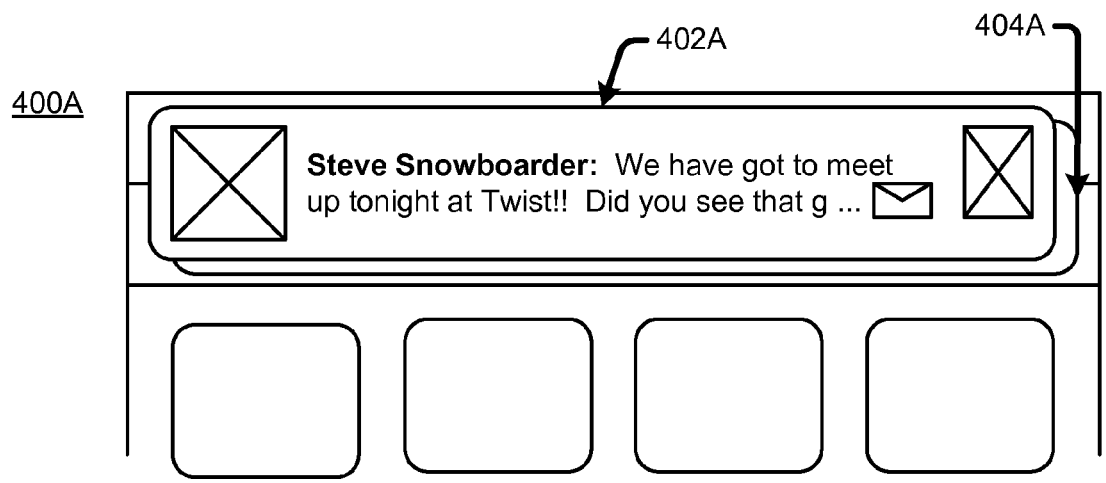
FIGS. 4A and 4B illustrate screen shots of a non-modal notification pop-up user interface serializing or ordering multiple messages.
Figure 4B:
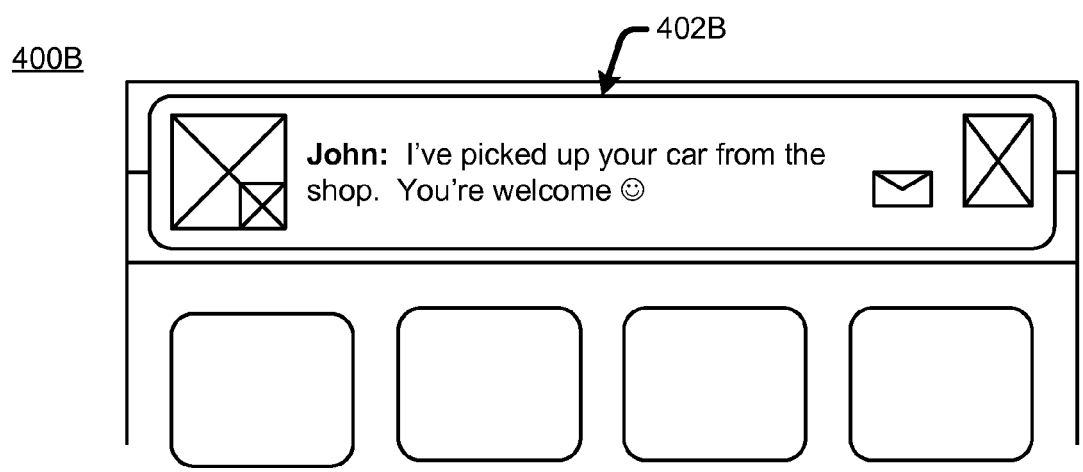

FIGS. 4A and 4B illustrate an example technique of managing two simultaneously incoming messages.

FIG. 4A shows a screen shot 400A of a first message 402A and a second message 404A arriving substantively simultaneously. To indicate that there are additional messages, the second message 404A is graphically shown to be stacked underneath the first message 402A.

If the user responds to the first message before it disappears, operation is as discussed with respect to FIGS. 3A, 3B and 3C. In the meantime, the user is not interrupted in his or her operation of the underlying application.

FIG. 4B shows a screen shot 400B if the user lets the first message 402A lapse. All that is left is the second message 402B. The second message 402B appears for a predetermined or preconfigured amount of time. If the user responds to the second message before it disappears, operation is as discussed with respect to FIGS. 3A, 3B and 3C. As with the first message, the user is not interrupted in his or her operation of the underlying application.

Example Message Queue Component

The notification pop-up user interface or alternative user interfaces may be coupled to a message queue component and rules engine. The message queue component and rules engine may manage a large number of disparate message notifications, messages and message threads. In particular the message queue component and rules engine converges messages not only from different mediums, such as voicemail and email, but also different protocol stacks, such as SMTP and SMS messages, and from different application sources such as system alerts and social networking notifications. Because the disclosed message queue component and rules engine not only leverages data formats information about incoming messages, but also information about the originating application of incoming messages, the message queue component and rules engine enable aggregated summaries of a much wider range of messages and notifications than previous unified messaging efforts. For example, a user may prioritize different application sources. A user may assign a high priority to work related alerts, for example a server administrator receiving a notification of a server crash. In contrast, a user may assign a low priority to social Tweets or Facebook™ notifications. A message queue that merely aggregated different messages with different transports and data formats would hide the server crash notification in a mass of personal social networking notifications. Accordingly the user would be obliged to search his or her notifications manually on a periodic basis, which obviates the advantage of receiving, rather than polling for, notifications.

Figure 5:
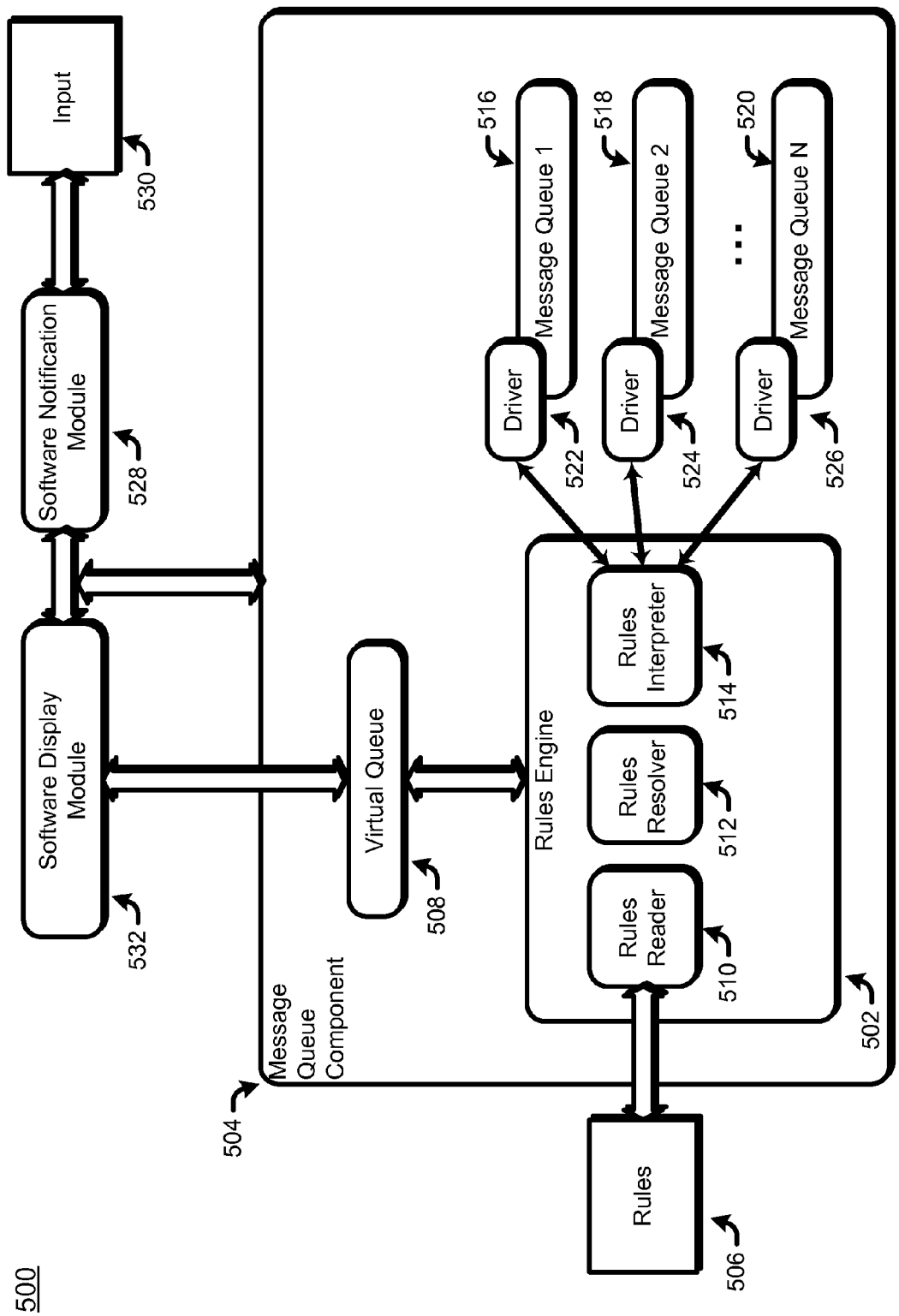
FIG. 5 illustrates a message queue component, rules engine, and virtual queue for the unified notification platform.

FIG. 5 illustrates an example operation 500 of the rules engine 502 and message queue component 504.

A. Rules Engine

The rules engine 502 reads rules 506 as input into the unified notification platform, and populates the virtual queue 508 with messages according to the rules 506. The rules engine comprises a rules reader 510, a rules resolver 512, and a rules interpreter 514.

The rules reader 510 operates to read the input rules 506. The rules 506 may be in the form of a text file, a script, or alternatively in a binary format. The rules reader 510 will tokenize and parse the rules 506 and will search for syntax errors. If no syntax errors are identified, or if no rules can be extracted, operation ceases. However, if rules can be extracted from the input rules 506, the extracted rules are then forwarded to the rules resolver 512.

Rules resolver 512 operates to resolve contradictory rules. The rules engine 502 may have multiple rules applied. The rules engine 502 may apply heuristics to resolve contradictory rules. One example heuristic is to prioritize the most recently set rule. Another example heuristic is to prioritize create operations and deprioritize delete operations. The heuristics may be specified in a configuration file, or alternatively may be hardcoded as defaults into the rules engine. Because the rules engine exposes its functionality via an API, the resolution heuristics as well as other rules operations may be extended programmatically.

Upon resolving the extracted rules, the rules are then interpreted by rules interpreter 514. Whenever a message enters one of the various message queues (516, 518, 520), the message is scanned by the rules interpreter. Based on the rules, the rules interpreter will extract the incoming message into the virtual queue.

B. Interpreting Rules from Message Queue Component Primitives

The rules interpreter 514 effects operations on the various message queues (516, 518, 520) and the virtual queue 508 via programmatic invocation of drivers (522, 524, 526). Each of the various message queue (516, 518, 520) has its own respective driver (522, 524, 526). In addition to performing message specific processing, the drivers provide entry points to perform linear data structure operations on the various message queues (516, 518, 520) and the virtual queue 508.

These linear data structure operations, act as functional primitives for the rules 506. The drivers (522, 524, 526) may also support linear data structure operations on each queue (516, 518, 520) respectively including, but not limited to stack operations such as top, push and pop; queue operations such as top, push and remove; array operations such as indexed random access, reorder, search and sort. In particular, reordering, searching and sorting of messages and notifications within queues according to attributes and meta-attributes may be supported.

In addition to performing data operations on queues (516, 518, 520), the drivers (522, 524, 526) may modify the queued messages or notifications themselves and/or their attributes and meta-attributes. For example, where the rules engine identifies that message with a potential virus, the rules engine may neutralize the message by setting an attribute marking the message as suspect, and may disable embedded scripts and executables in the message while preserving text. Additionally, the drivers may read messages and/or attributes and meta-attributes. For example, the rules engine could perform caller-id by displaying the sender identifier attribute as part of the notification. Since the rules engine has access to all queues (516, 518, 520) and may both read and modify messages and their attributes and meta-attributes, the rules engine may mix and match data from different queues (516, 518, 520). For example, the rules engine might compare messages from different queues (516, 518, 520), and mark messages considered redundant.

For example, if the rules interpreter 514 has a rule to prioritize parents' messages first the rules interpreter may determine whether the incoming message has a parent/guardian flag meta-attribute set. If the message entered into a message queue 516, driver 522 would provide a notification to the rules interpreter 514. The rules interpreter 514 would then invoke the driver 522 to extract the incoming message and delete it from the message queue 516. If the message had its parent/guardian flag meta-attribute set, the rules interpreter 514 might set the priority meta-attribute to a high value, and place the message in the virtual queue 508 accordingly. Otherwise, the rules interpreter 514 might place the incoming message into the end of the virtual queue 508 for ordinary processing.

The rules engine 502 may periodically receive new rules, have rules deactivated or deleted, or have rules modified. Upon receipt, the rules engine 502 may update or refresh the various message specific queues (522, 524, 526) and/or the virtual queue 508 according to the rules changes. As above, the queue updates are effect via functional primitives exposed by the drivers (522, 524, 526).

As can be seen from the foregoing discourse, rules 506 are executed by the rules interpreter 514 in terms of functional primitives exposed by drivers (522, 524, 526).

C. Software Notifications

At any point, the virtual queue 508 may be accessed for viewing or other reporting. Viewing and reporting is performed by the software notification module 528. The software notification module 528 is coupled to receiving input notifications from the system 530 such as button presses and notifications from the rules engine 502 and message queue component 504. The software display module 532 is also coupled with the software display module to produce viewing and reporting user interfaces.

The software notification module 528 may receive an indicator from the rules engine 502 that a new message has been placed in the virtual queue 508. At that point, the software notification modules can trigger the software display module 532 to display a user interface such as the non-modal notification pop-up. The software notification module 528 may also receive input 530 from the user in the form of button presses to effect changes to the user interface displayed by the software display modules 532.

Alternatively, the user may enter input 530 for processing by the software notification module 528 to invoke the message queue component 504 and the software display module 543 to activate views and reports such as the example message count reports described above.

Input need not come in the form of ordinary button presses which may also be handled by the client device's operating system, but also in the form of remote invocations via an API.

Notification Suppression

Figure 6:
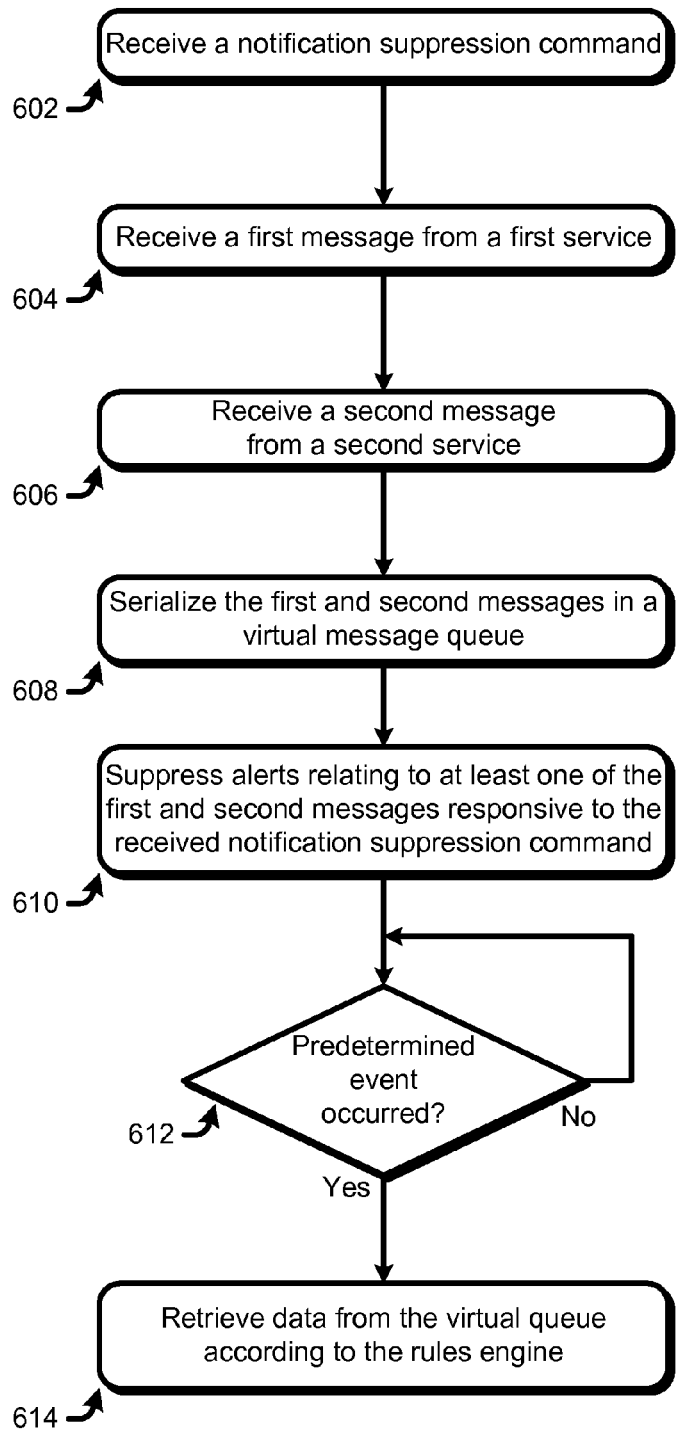
FIG. 6 is a flow chart of an example operation of notification suppression in the unified notification platform.

Operation of the uniform notification platform user interface may be suppressed upon request. For example, if the user deactivates the client device, for sleep, for device recharging, or other reasons, the user faces the potential of receiving a deluge of pending messages as indicated by the user interface. For these situations, the user may trigger an alert suppression command. FIG. 6 shows a flowchart 600 of an example notification suppression operation.

At block 602, the unified notification platform receives a suppression command. The suppression command could be via a hotkey, or alternative from a configuration dialog displayed by the unified notification platform. A suppression command may be inferred programmatically as well. For example, if the client device is locked, or a user has not logged on, the user interface may be suppressed.

Because suppression may be implemented as a directive to ignore notifications, the directive may support logic to conditionally ignore notifications. Specifically, the rules engine may apply conditions as to when notifications are ignored, and when they are not. For example, the user may apply a rule to ignore all notifications except those for work and with a date-time stamp between 2:00 AM and 4:00 AM. In that way, when the user turns off suppression, the user may immediately receive those notifications as per the applied rule.

At blocks 604 and 606, the unified notification platform receives a first message and a second message. Although notifications are suppressed, the operation of the message queue component 504 and the rules engine 502 is still in operation. It is only the user interface that is suppressed. Accordingly the messages are serialized or ordered and placed into the virtual queue 508 as in ordinary operation.

At block 610, the software notification module 528 traps notifications from the message queue component 504 and the rules engine 502 that incoming messages have been received. Rather than invoking the software display module 532, the software notification module 528 simply discards the trapped notifications. In this way, the user interface is suppressed.

In the meantime, at block 612, the unified notification platform awaits a predetermined event to reactivate the user interface. The predetermined event may be a reserved hotkey or alternatively a change to a user configuration dialog. The predetermined event may be part of another user action such as unlocking the client device or logging on.

In the event the predetermined event occurs, at block 614 the unified notification platform may refresh the user interface by updating the virtual queue 508 and retrieving data from the virtual queue 508 according to the rules engine 502.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for managing messages, the system comprising:
    a processor;
    a hardware user interface communicatively coupled to the processor;
    a hardware display communicatively coupled to the processor;
    a message queue component, operative on the processor, that manages in a virtual queue a plurality of messages received from first and second services of a plurality of services, at least one message being associated with a user relationship centric meta-attribute, wherein the first service and the second service are different ones of email services, messaging services, voicemail services, social networking services, an operating system, or a device service; and
    a software display module, operative on the processor, that causes data relating to messages managed by the message queue component to be displayed in the hardware display, based at least on the user relationship centric meta-attribute of at least one message,
    wherein data associated with a specific person or specific category of persons is displayed and display of other data associated with a plurality of other persons or categories of persons is suppressed until the data associated with the specific person or the specific category of persons is viewed, and
    the other data associated with the plurality of other persons or categories of persons is displayed after the data associated with the specific person or the specific category of persons is viewed,
    wherein the user relationship centric meta-attribute comprises information identifying one or more specific persons or specific categories of persons that have a specified relationship with a user of the system.

2. The system of claim 1, wherein the software display module comprises a separate window on the hardware display that operates non-modally as not to block the operation of a software user interface of a previously opened application, and in which the separate window provides at least one of the following options:
    replying to a message;
    adding in-line comments to a message; and
    reviewing a plurality of messages that are graphically stacked in the separate window.

3. The system of claim 1, wherein the hardware user interface comprises a custom button, and wherein the software display module displays data relating to messages in the message queue component responsive to activation of the custom button.

4. The system of claim 1, further comprising a data operations rules engine, operative on the processor, which stores a rule and performs at least one data operation on the virtual message queue.

5. The system of claim 4, wherein the at least one data operation on the virtual message queue is any one of:
    adding a message to the virtual message queue;
    retrieving a message from the virtual message queue;
    reordering a message in the virtual message queue;
    updating a message in the virtual message queue; or
    deleting a message from the virtual message queue.

6. The system of claim 4, wherein each message in the virtual message queue retains at least one attribute value and the virtual message queue is operative to update at least one attribute value of at least one message in the virtual message queue.

7. The system of claim 6, wherein the attribute values are any one of:
    a date-time stamp;
    a read flag;
    a sender identifier;
    a subject identifier;
    a to line;
    a message memory size;
    an attachment included flag;
    an importance flag; or
    a source identifier.

8. The system of claim 7, the system further comprising a queuing rules engine, operative on the processor, that stores a rule, and sets at least one attribute value of at least one message in the virtual message queue according to the rule.

9. The system of claim 4, the system further comprising an application programming interface, the application programming interface comprising software functions to programmatically access the virtual message queue, the rules engine, or both.

10. A computer-implemented method for managing messages from a plurality of services, the method comprising:
    receiving a first message from a first service and receiving a second message from a second service, at least one of the messages being associated with a user relationship centric meta-attribute, wherein the first service and the second service are different ones of email services, messaging services, voicemail services, social networking services, an operating system, or a device service;

ordering the first message and the second message in a virtual message queue; and displaying data relating to the virtual message queue in a window, based at least on the user relationship centric meta-attribute of one of the messages, wherein the displaying includes:

displaying data associated with a specific person and suppressing display of other data associated with a plurality of other persons until the data associated with the specific person is viewed, and displaying the other data associated with the plurality of other persons after the data associated with the specific person is viewed, wherein the user relationship centric meta-attribute comprises information identifying a specified relationship between a user of the computer-implemented method and the specific person.

11. The method of claim 10 wherein, the displayed data comprises any one of the following:

a message count by message service report wherein a first message count for the first service is displayed with a second message count for the second service;

a message count by thread report wherein the first message and the second message are in the same message thread, and the displayed data is a count of messages in a message thread; or a message thread count report wherein the first message and the second message are in the same message thread, and the displayed data is a count of message threads.

12. The method of claim 10, further comprising retrieving data from the virtual message queue via applying a rule with a rules engine, wherein the displayed data relating to the virtual message queue is the retrieved data.

13. The method of claim 12, wherein the rule is to increase retrieval priority of messages from a sender with a user relationship centric meta-attribute.

14. The method of claim 13, wherein the user relationship centric meta-attribute is any one of:

the sender is a parent/guardian of a particular user;
the sender is a family members of a particular user;
the sender is a friend of a particular user;
the sender is in a very important person (VIP) list for a particular user;
the sender is in a the same professional group as a particular user;
the sender is in the same social network group as a particular user; or
the sender is associated with a particular user's employment.

15. The method of claim 12, further comprising:
receiving an notification suppression command; and
suppressing notifications relating to at least one of the ordered first message and second message responsive to receiving the notification suppression command, wherein the applied rule is to suppress messages satisfying a predetermined criterion until a predetermined event occurs.

16. The method of claim 15, wherein the predetermined event is any one of:

all messages where the sender is a parent/guardian of a particular user have been responded to;
all messages with an importance flag set have been responded to;
a predetermined time period has passed; or
a service payment has been made.

17. The method of claim 12, the method further comprising:
receiving a rule update;
retrieving updated data from the virtual message queue via applying the rule update with the rules engine; and
displaying the updated data.

18. The method of claim 10, further comprising:
resolving a plurality of contradictory rules by preferentially applying rules according to a predetermined priority with a rules engine; and
retrieving data from the virtual message queue according to the applied resolved rules with the rules engine,
wherein the displayed data relating to the virtual message queue is the retrieved data according to the applied resolved rules.

19. A computer storage device containing instructions to be executed by a processor for implementing operations to manage messages from a plurality of services, the operations comprising:

receiving a first message from a first service and receiving a second message from a second service, wherein at least one of the messages is associated with a user relationship centric meta-attribute, wherein the first service and the second service are different ones of email services, messaging services, voicemail services, social networking services, an operating system, or a device service;

serializing the first message and the second message in a virtual message queue;

retrieving data from the virtual message queue via applying a rule with a rules engine, wherein the data is associated with a specific person or specific category of persons and the retrieving includes suppressing retrieval of other data associated with a plurality of other persons or categories of persons until the retrieved data associated with the specific person or the specific category of persons is viewed;

displaying the retrieved data in a separate window based at least on the user relationship centric meta-attribute of one of the messages, wherein the separate window operates non-modally on a hardware display as not to block the operation of a software user interface of a previously opened application on the hardware display;

retrieving the other data from the virtual message queue via applying a rule with a rules engine, wherein the retrieving includes retrieving the other data after the retrieved data associated with the specific person or the specific category of persons is viewed; and after retrieving the other data, displaying the retrieved other data in the separate window, wherein the user relationship centric meta-attribute comprises information identifying a specified relationship between a user of the computer storage device and the specific person or the specific category of persons.

* * * * *